Oct. 25, 1966   R. NEUSCHOTZ   3,280,666
TOOLS FOR INSTALLING THREADED ELEMENTS
Filed March 20, 1964   3 Sheets-Sheet 1
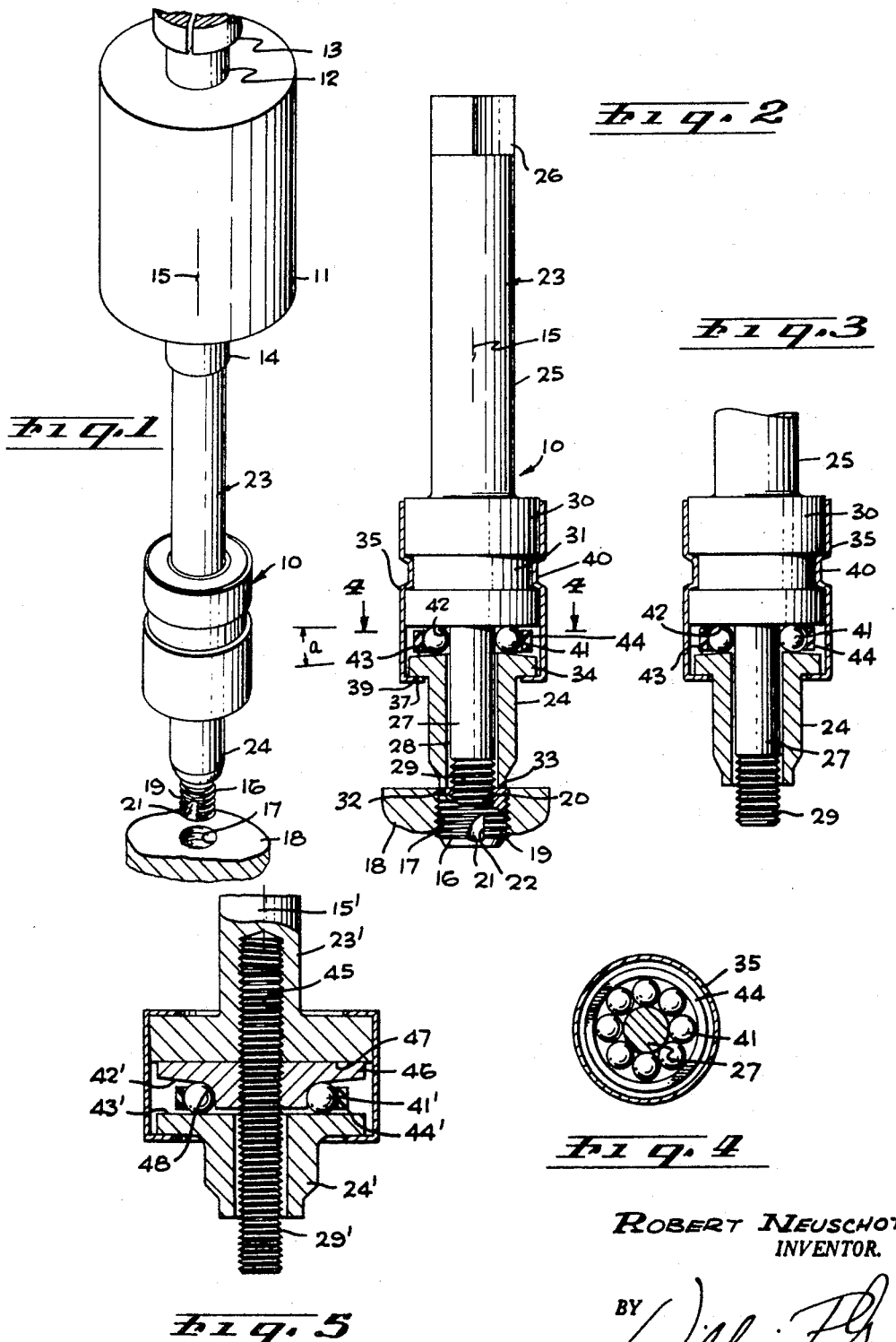
ROBERT NEUSCHOTZ
INVENTOR.
BY William P. Green
ATTORNEY

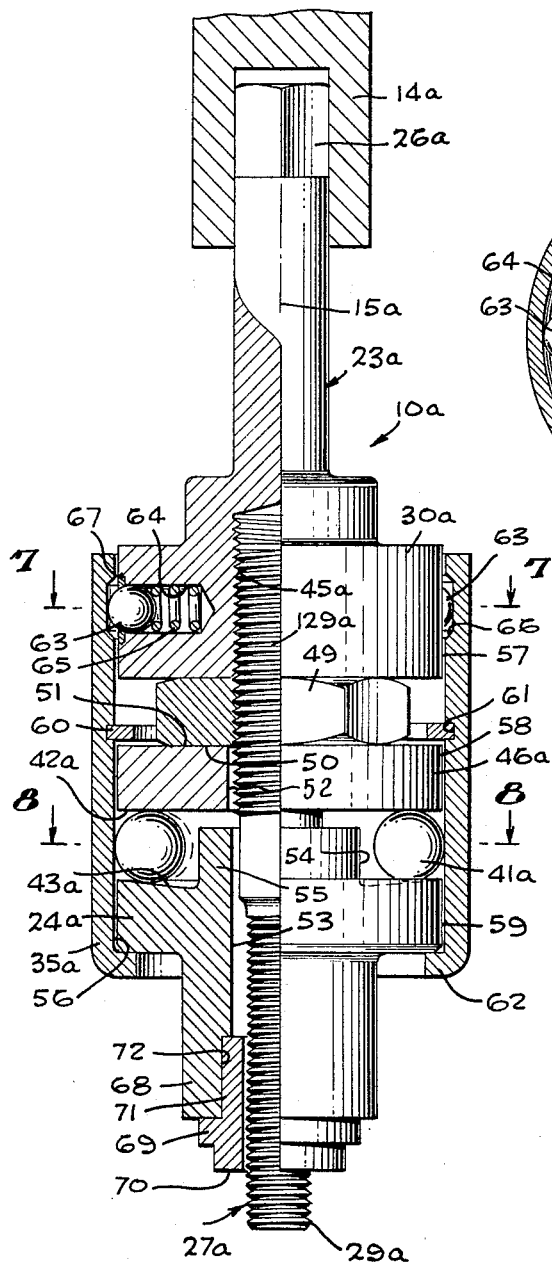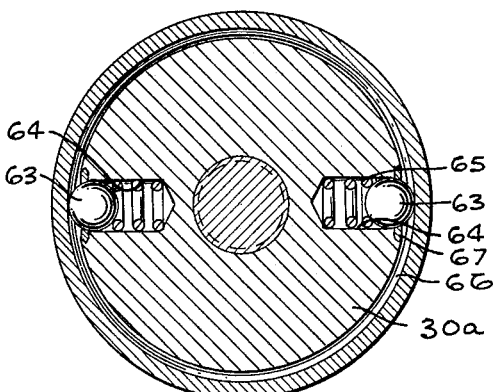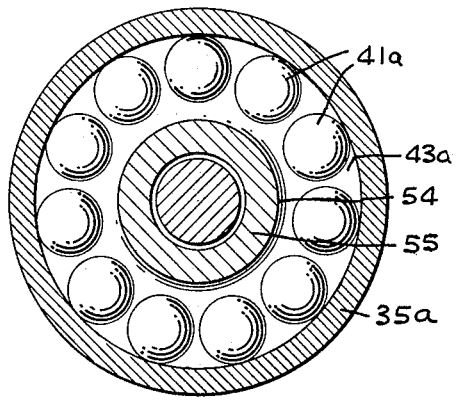

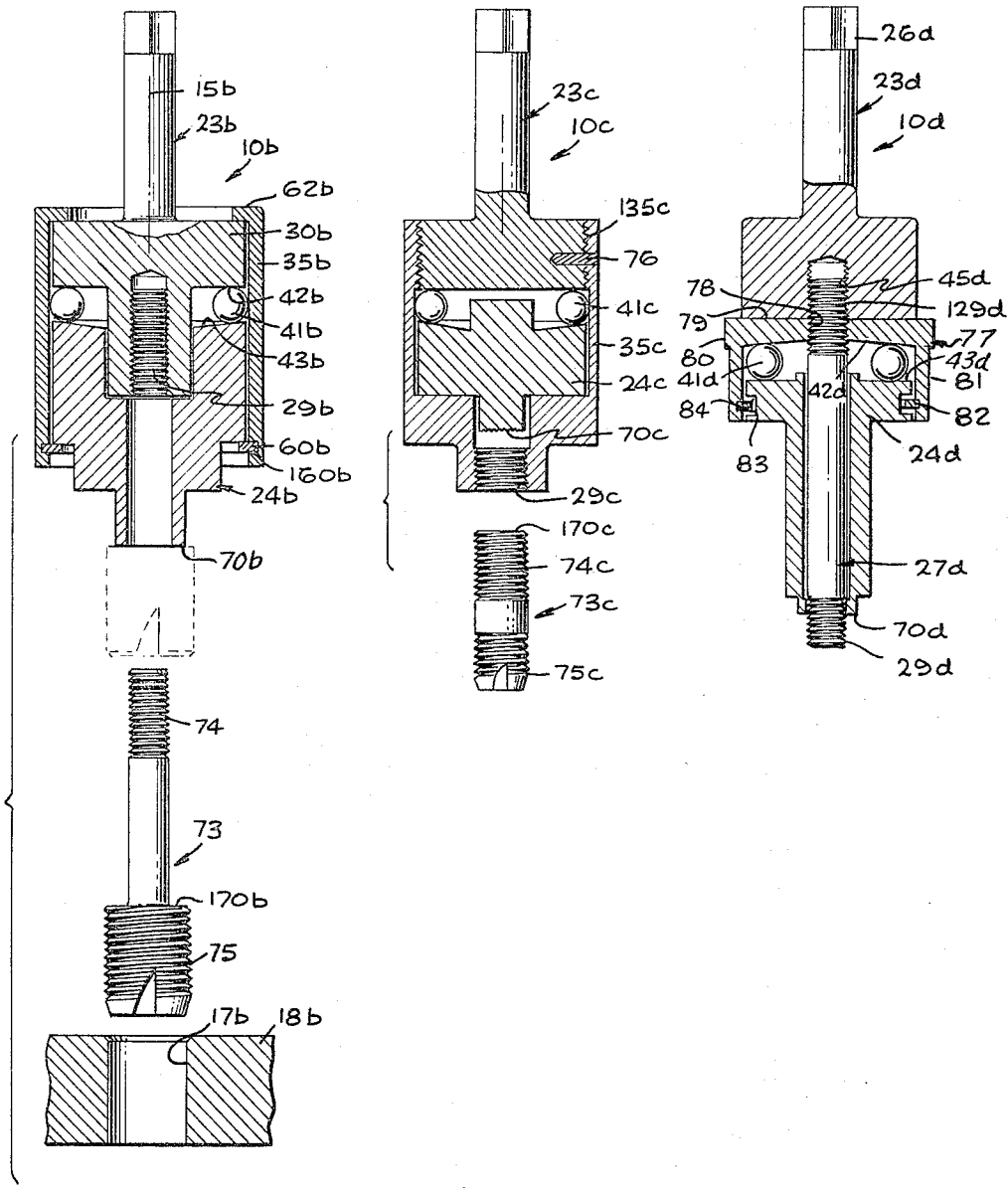

United States Patent Office 3,280,666
Patented Oct. 25, 1966

3,280,666
TOOLS FOR INSTALLING THREADED ELEMENTS
Robert Neuschotz, 1162 Angelo Drive,
Beverly Hills, Calif.
Filed Mar. 20, 1964, Ser. No. 353,555
17 Claims. (Cl. 81—53)

The present application is a continuation-in-part of my copending application Serial Number 257,907, filed February 12, 1963 on Tools For Installing Inserts, now abandoned.

This invention relates to certain unique tools for screwing into a recess or bore in a carrier part a threaded element or insert of the type having a first set of external threads to be screwed into the carrier part, and a second set of threads which are then engageable with a third member to secure that member to the carrier part through the medium of the insert. It is contemplated that the second set of threads of the insert may be either internal or external, to receive either an externally threaded or internally threaded mating part.

The tools embodying the invention are of a known general type adapted to install an insert by first threadedly connecting the insert to the tool, then actuating the tool to screw the insert into threaded engagement with the carrier part, and finally unscrewing the tool from the insert by leaving the latter in the carrier part. One problem which has been encountered with some prior tools of this general type, particularly where the insert is of a self-tapping character offering substantial resistance to installing rotation, is that of preventing such tight frictional engagement or binding of the tool with respect to the insert as to cause removal of the insert with the tool. To release such binding engagement, it has heretofore been proposed that the tool be formed of two sections, one of which is threadedly connected to the insert and is adapted to be turned relative to the other section during the initial unscrewing movement, in a manner releasing the binding engagement with the insert and thereby assuring removal of the tool separately from the insert.

A major object of the present invention is to provide a new way of facilitating the initial unscrewing rotary movement of one such section relative to the other section, to thereby enhance the release of the tool from the insert. This result is attained by the invention in a very simple manner with the release of the tool from the insert being positive and reliable to the extent of definitely assuring detachment of the tool without even slight unscrewing rotation of the insert relative to or from the carrier body.

Structurally, I provide spherical balls for transmitting forces axially from one of the sections to the other, and I shape the surfaces engaged by these balls in a manner enabling the balls to shift radially through short distances relative to the engaged surfaces, and by such shifting movement to instantaneously release the binding engagement between the tool and insert. More particularly, the two surfaces engaged by the balls are designed to progressively advance away from one another as they advance in a predetermined radial direction, preferably radially outwardly, so that if the balls move radially in the direction in which the engaged surfaces flare apart, the force transmitting engagement of the balls with those surfaces will be released slightly, to break the connection between the tool and the insert.

In one form of the invention, the discussed radial movement of the ball is resisted by appropriate yielding means, such as an elastomeric ring or member acting against the balls, or a metal retaining spring. In this arrangement, the angularity of the diverging surfaces, and the resilience of the yielding means, are so selected and related as to enable transmission of axial forces through the balls during the initial installation of the insert, while allowing automatic radial shifting movement of the balls, and therefore release of the binding connection between the tool and insert, upon initiation of unscrewing rotary movement of the main section of the tool.

In another form of the invention, which is presently preferred for many uses, the two ball engaging surfaces diverge in such a direction as to eliminate the necessity for the above discussed yielding means, by utilizing centrifugal force developed as a result of insert installing rotation of the tool to hold the balls in an initial power transmitting position, from which they are retractable automatically upon initial unscrewing rotation of the tool. For this purpose, the two surfaces may diverge as they advance radially inwardly.

The above and other features and objects of the invention will be better understood from the following detailed description of the typical embodiments illustrated in the accompanying drawings, in which:

FIG. 1 is a perspective view showing a tool embodying the invention as it appears in use;

FIG. 2 is essentially an axial sectional view through the FIG. 1 tool;

FIG. 3 is a view similar to FIG. 2, but showing the tool detached from the insert;

FIG. 4 is a transverse section taken on line 4—4 of FIG. 2;

FIG. 5 is a view similar to FIG. 3, but showing a variational form of the invention;

FIG. 6 is a view of another variational form of the tool embodying the invention, shown partially in axial section;

FIGS. 7 and 8 are transverse sections taken on lines 7—7 and 8—8 respectively of FIG. 6; and FIGS. 9, 10 and 11 are views similar to FIG. 6, but showing three additional forms of the invention.

In FIG. 1, I have designated generally at 10 a tool embodying the invention, with the tool being illustrated as driven by a conventional tapping attachment 11. Attachment 11 has a rotary power input shaft 12, which is driven by the chuck 13 of a conventional drill press, portable drill, or other driving unit. Tapping attachment 11 has an output chuck 14 which is driven by unit 11 rotatively about axis 15 of the apparatus, and is simultaneously progressively advanced axially during and in accordance with such rotary movement.

Tool 10 is utilized for screwing a threaded insert 16 into an opening or bore 17 formed in a carrier part 18. Bore 17 may either be pre-threaded to receive the insert, or be initially of straight cylindrical unthreaded configuration, with insert 16 being designed to tap its own mating threads into the carrier part as the insert is screwed into its ultimate FIG. 2 position.

As seen best in FIG. 2, the insert 16 may be a simple tubular body having external threads 19 for engaging carrier part 18, and having internal threads 20 to which a mating stud or bolt may be connected after installation of the insert within the carrier part. In FIGS. 1 and 2, I have typically represented a self-tapping insert, having recesses 21 cut into its outer surface to form cutting edges at 22 capable of cutting threads in part 18 as insert 16 is screwed into position.

The installing tool 10 illustrated in FIGS. 1 through 4 includes a first and main section 23 which is driven by a tapping attachment 11, and a second section 24 taking the form of an annular sleeve for bearing axially inwardly against the insert. Section 23 has an externally cylindrical drive shank 25, centered about axis 15, and having an externally non-circular end portion 26, typically of square cross section transversely of axis 15, to be received within and be driven by the chuck or drive element 14 of tapping attachment 11. Chuck 14 may typically have a non-circular recess shaped in correspondence with portion 26 of shank 25, to effectively receive and drive the shank.

The opposite end of section 23 of the tool may form a second shank 27, which may be of smaller diameter than shank 23, and has a cylindrical surface 28 centered about axis 15, and external threads 29 at the extremity of shank 27, also centered about axis 15. Formed integrally with the two shanks 25 and 27, section 23 has an enlarged diameter portion 30, which may be externally cylindrical as shown and have an annular reduced diameter groove at 31.

Section 24 of the tool is tubular and disposed about shank 27, in closely fitting relation with respect thereto, but with sufficient clearance being provided to allow rotation of section 24 relative to section 23. At its exposed ends, section 24 has an annular surface 32 extending transversely of axis 15, and adapted to bear axially against an end surface 33 of insert 16. The opposite end of section 24 forms an annular radially outwardly projecting flange 34. A tubular sheet metal retaining part 35 secures section 24 against removal from section 25, while still allowing relative rotation of the two sections. Element 35 may have a radially inturned flange 37 at one end turned inwardly to abut against and be rotatably engaged by a transverse surface 39 on section 24. A radially inwardly deformed annular portion 40 of element 35 may be engaged within groove 31 to secure element 35 in fixed position relative to section 25.

Load forces are transmitted axially from section 23 to section 24 through a series of balls 41 located at different circularly offset positions about shank 27. At their opposite sides, balls 41 engage an annular shoulder surface 42 formed on enlargement 30, and an opposed annular surface 43 formed on part 24. Surfaces 42 and 43 extend generally radially with respect to axis 15, but are not exactly parallel to one another, so that surfaces 42 and 43 progressively advance away from one another as they advance in a predetermined radial direction (radially outwardly in this form of the invention). More particularly, in the arrangement illustrated in FIG. 2, surface 42 is disposed directly transversely of axis 15, while surface 43 advances gradually and progressively away from surface 42, at an angle $a$, as the two surfaces advance radially outwardly. Surface 43 may therefore be defined as having a slight frusto-conical angularity. Preferably, the flaring angle $a$ is less than ten degrees, desirably between about two and five degrees, for best results about three degrees. Balls 41 are yieldingly urged radially inwardly to their FIG. 2 positions by means of an annular elastomeric ring 44, which may be formed of rubber or any other suitable elastomeric material.

In using the device of FIGS 1. through 4, an operator first manually screws insert 16 onto the exposed or outwardly projecting portions of threads 29 formed on shank 27. These threads 29 are preselected to mate with the internal threads 20 formed in the insert. With the insert thus carried by the tool, drive portion 26 of tool shank 25 is inserted into power transmitting engagement with chuck 14 of tapping attachment 11, and the drill press driving the tapping attachment is then energized so that section 23 of the tool is driven rotatively and simultaneously advanced axially in correspondence with the pitch of threads 19. This movement of the insert is utilized to screw the insert into bore 17 in carrier part 18, so that threads are tapped in the carrier part, with the insert ultimately reaching the fully installed position of FIG. 2.

During the advancement of insert 16 into the carrier part, section 24 of the tool bears axially against the insert, with axial force being transmitted from section 23 through balls 41 and section 24 to shoulder 33 of the insert. The radially inward constricting force exerted against the balls by elastomeric member 44 is great enough to overcome any camming effect which might be exerted by surfaces 42 and 43, and thus retain the balls in their FIG. 2 innermost positions during the driving of insert 16 into the carrier part.

After the insert reaches its fully installed position of FIG. 2, the rotary and axial advancement of the tool is halted and the tapping attachment is actuated to drive section 23 in the reverse or unscrewing rotary direction, and to simultaneously retract that section axially, to unscrew shank 27 from the insert. At the instant that this left-hand unscrewing rotation of section 23 commences, end surface 32 of section 24 and the end 33 of insert 16 are in very tight frictional binding engagement, as a result of the resistance encountered by the insert during its advancement into the carrier part. This frictional engagement at 32–33 tends to prevent rotation of section 24 with section 23 as the latter is unscrewed from the insert. As a result, section 23 turns relative to section 24, with the relative motion being rendered possible by the provision of balls 41 between these parts. Also, the initiation of this relative motion between sections 23 and 24 is greatly enhanced by the diverging angularity of surfaces 42 and 43. This is true because, as section 23 is first turned in the left-hand unscrewing direction, balls 41 are free to move slightly radially outwardly, against the tendency of elastomeric ring or band 44, and under the influence of the camming action caused by surfaces 42 and 43, so that the balls are received between portions of surfaces 42 and 43 which are spaced farther apart than are their radially innermost portions. Section 24 is thus freed for slight axial retracting movement relative to section 23, to break the binding engagement between surfaces 32 and 33, so that after the initial slight unscrewing movement of sections 23, sections 23 and 24 may both move together in easily withdrawing from the insert.

To discuss the breakaway action in somewhat different terms, it may be noted that, during this action, the mentioned camming effect is supplemented by the natural tendency of balls 41 to roll circularly along surfaces 42 and 43 in a direction tending to release the binding engagement between surfaces 32 and 33. That is, during left hand rotation of section 23, there are two coacting factors which together facilitate turning of this section relative to section 24, the first of these factors being the camming action of surfaces 42 and 43 on balls 41, and the second factor being the simultaneous tendency for balls 41, as they are cammed, to roll circularly along surfaces 42 and 43 in a releasing direction. During the right hand installing rotation of the tool, on the other hand, any circular rolling action of the balls could only serve to increase the binding effect, and as a result there is no relative motion whatever between sections 42 and 43 as the insert is screwed into the carrier part.

FIG. 5 shows a variational form of insert installing too which may be considered as essentially the same as FIGS. 1 through 4, except in the following respects. In the first place, the threaded shank 29' to which the insert to be driven is attached may, in FIG. 5, be a saparately formed part, screwed into a threaded bore 45 formed in section 23'. The shank 29' may be locked in any adjusted setting with respect to section 23' by means of a lock nut 46 threaded onto the shank and tightened against transverse end surface 47 of section 23'. Section 24' may have the somewhat altered cross section illustrated in FIG. 5, with balls 41' being received between element 46 and section 24'. Also, instead of the elastomeric band 44 of FIGS. 1 through 4, the arrangement of FIG. 5 may have a circularly discontinuous metal spring element or band 44', yieldingly urging the balls inwardly against an annular surface 48 of part 46. As in the first form of the invention, surfaces 42' and 43' diverge slightly as they advance radially outwardly, to attain the same results accomplished by the divergence of surfaces 42 and 43 in FIG. 2. FIG. 5 typically illustrates an arrangement in which surface 43' is disposed directly transversely of the main axis 15' of the tool, while surface 42' is at a slight frusto-conical angularity. The functioning of the FIG. 5 form of the invention, to first screw an insert into a carrier part, and then break the frictional engagement between section 24' and the insert so that the tool may be unscrewed from the insert, will be apparent from the prior discussion of the FIGS. 1 through 4 form of the invention.

FIGS. 6, 7 and 8 illustrate another variational form of insert installing tool, in which the two annular ball engaging surfaces 42a and 43a diverge as they advance radially inwardly, rather than as they advance radially outwardly, to thereby enable use of centrifugal force for retaining the balls in their outer active positions during insert installing rotation of the tool. As in FIGS. 1 through 4, the tool 10a of FIGS. 6 through 8 includes section 23a having an externally non-circular end portion 26a adapted to be connected to and driven by the chuck 14a of a tapping tool. Part 23a carries a replaceable threaded shank or screw element 27a, having a first set of threads 29a for internally engaging an insert such as that shown at 16 in FIG. 2. A second set of threads 129a, of similar or somewhat larger diameter, are connectible into an internally threaded bore 45a formed in enlarged portion 30a of element 23a, with the shank 27a being tightly secured in any desired set position within recess 45a by tightening of a locking nut 49, received about and engaging threads 129a, upwardly against the undersurface of portion 30a of element 23a.

At its underside, nut 49 has an annular planar surface 50 which extends transversely of main axis 15a of the tool, and engages a correspondingly transverse annular upper surface 51 of an upper ball contacting element 46a. This part 46a has an inner cylindrical surface 52 of a diameter slightly greater than the external diameter of threads 129a, to be received about that threaded portion 129a of element 27a. Also, part 46a is the element which has at its underside the previously mentioned ball contacting surface 42a, which surface is annular and planar and extends directly transversely of axis 15a.

The balls themselves are designated 41a in the drawings, and engage at their undersides the previously mentioned surface 43a, which is formed on an annular part 24a containing an inner typically cylindrical passage or bore 53 through which shank 27a extends. Part 24a and its surface 43a are disposed annularly about axis 15a. Surface 43a diverges gradually away from transverse surface 42a, as the two advance radially inwardly toward axis 15a, at a slight angle corresponding to the previously discussed angle a of FIG. 2, but reversed with respect thereto. As in FIG. 2, the angle of divergence is desirably less than about ten degrees, more preferably between about two and five degrees, and for best results about three degrees. Also, it is preferred that surface 43a have a configuration to appear, in cross section, as a straight line, as seen in the left side of FIG. 6, or stated differently it is preferred that this surface be of frustoconical shape.

The radially inward movement of balls 41a is limited by engagement of the balls with an external cylindrical surface 54 formed on an inner portion 55 of part 24a. Radially outward movement of the balls is limited by engagement of the balls with a tubular axially extending housing 35a, whose inner cylindrical surface 56 is of a diameter only very slightly greater than the diameter of the outer cylindrical surfaces 57, 58 and 59 of parts 23a, 46a and 24a respectively, to allow free rotation of those parts relative to the housing, but with all of the parts being effectively retained by the housing and the shank in the illustrated properly aligned positions. A snap ring 60 is removably received within an annular groove 61 formed in the inner surface of the housing, and coacts with an inturned annular bottom flange 62 of the housing to retain balls 41a and their upper and lower elements 46a and 24a in assembled position within the housing. Part 23a and its connected elements 49 and 27a are retained in the housing by means of a pair of ball detents 63 which are received within diametrically opposed recesses 64 formed in portion 30a of element 23a, and are yieldingly urged radially outwardly by individual springs 65 into an annular groove 66 formed in the side wall of the housing. Balls 63 may be retained in portion 30a against separation therefrom, when the portion 30a is withdrawn upwardly from the housing, by means of individual retaining rings 67 screwed into portion 30a, or by locally upsetting portion 30a to restrict the outer ends of passages 64 in a manner preventing outward movement of the balls.

The lower reduced diameter end portion 68 of element 24a may carry a tubular annular nose piece 69, having a shoulder or transverse end surface 70 at its lower end for engaging the upper end of the insert to be driven in correspondence with the teaching of FIG. 2. Element 69 may have a portion 71 which is a tight frictional fit within recess 72 formed in part 24a, to be tightly secured in fixed position relative to part 24a.

The tool of FIGS. 6 through 8 is utilized in the same manner as has been discussed in connection with FIGS. 1 through 4, with the insert first being screwed onto the lower downwardly projecting end of shank 27a, and the part 23a then being rotated and axially advanced to screw the insert into the carrier part. The rotation of element 23a is sufficiently rapid to cause balls 41a to move radially outwardly to their full line positions of FIG. 6, by centrifugal force, with the balls remaining in these outwardly displaced positions until the insert is screwed fully into the carrier part. To enable initial outward movement of the balls, the insert may initially be screwed onto shank threads 29a only partially, and not into engagement with shoulder 70, so that parts 24a and 46a may separate slightly relative to one another as the balls move outwardly under the influence of centrifugal force.

When the insert is fully installed, the operator reverses the direction of rotation of element 23a, and as this part commences to turn in a left-hand unscrewing direction, balls 41a instantaneously move radially inwardly from their full line positions of FIG. 6, and toward positions of engagement with surface 54 of part 24a. At this instant, the unscrewing rotation has not as yet increased to a rate of rotation sufficient to develop any substantial centrifugal force, and as a matter of fact the centrifugal force is of course initially of zero value, so that such force does not prevent inward movement of the balls. Immediately upon even the slightest radially inward movement of the balls, the tight binding engagement between shoulder 70 at the lower end of the tool and the insert is broken, as in the previously discussed forms of the invention, so that shank 27a may be easily unscrewed from the insert without removing the insert from the carrier part.

If it becomes necessary to replace element 27a, or substitute a shank of a different size, this may be done by merely withdrawing upwardly from housing 35a the part 23a and its rigidly attached elements 49 and 27a, by pulling upwardly with sufficient force to move detent balls 63 out of the engaged groove 66. Upon such removal of the upper assembly, snap ring 60 retains the other parts in assembled condition within the housing, and prevents escape of balls 41a from their confined positions.

FIG. 9 illustrates a tool which is similar to that of FIGS. 6 through 8 except that the FIG. 9 device is designed for use with an insert 73 which has an outwardly projecting externally shank or stud portion 74 in lieu of the internal threads of the insert shown in FIG. 2. The larger diameter external threads 75 of insert 73 may be self-tapping in character, and adapted to tap threads within a bore 17b formed in a carrier part 18b. The tool 10b of FIG. 9 includes a section 23b adapted to be driven by a rotary power operated drive mechanism, and having a transverse surface 42b engageable with a series of balls 41b. A second section 24b has an annular slightly angular surface 43b corresponding to surface 43a of FIG. 6, for engaging the opposite sides of balls 41b. An outer annular housing 35b is disposed about sections 23b and 24b, and interconnects them for relative rotary motion about axis 15b, and has a shoulder 62b engaging and retaining a shoulder portion 30b of section 23b, and a snap ring 60b engaged within a transverse groove 160b of part 24b.

The reduced threaded end 74 of insert 73 is screwed into a mating threaded passage 29b formed in section 23b. During the actual installation of insert 73, this element is screwed into part 23b to a position at which a transverse shoulder 170b on element 73 engages an annular transverse end surface 70b of section 24b, to thereby positively rotate insert 73 into bore 17b of the workpiece. During installation balls 41b are in their radially outermost positions. After the portion 75 of insert 75 has reached its fully installed setting in passage 17b, section 23b is rotated in a left-hand or unscrewing direction, so that balls 41b will move slightly radially inwardly and allow slight axial retracting movement of section 24b relative to the insert, to break any binding engagement between shoulders 70b and 170b. Thus, the tool is automatically freed for full removal from the insert in the same manner as discussed in connection with the prior forms of the invention.

FIG. 10 shows another form of the invention which is similar to that of FIG. 9, but is designed for use with inserts or studs 73c which do not have a driving shoulder such as that shown at 170b in FIG. 9. Instead, stud 73c has a first set of threads 75c adapted to be screwed into a carrier part, and a second set of threads 74c of approximately the same diameter which are to project outwardly from the workpiece after installation, for reception of a mating nut. The tool 10c has two sections 23c and 24c engageable with opposite sides of a series of balls 41c in the previously discussed camming relation. An outer annular housing part 35c is threadedly connected at 135c to section 23c, and is locked against relative rotation by a suitable set screw or dowel illustrated at 76. Part 35c extends about and beyond section 24c, and has a portion containing internal threads 29c for engaging threads 74c of the stud. Section 24c has a knurled or serrated essentially transverse surface 70c, which engages the end 170c of stud 73c, to transmit axial force thereto and thus serve the function of shoulder 70b of FIG. 9.

In using the tool of FIG. 10, threads 74c are screwed into threads 29c, and section 23c is then driven in a right-hand direction (assuming the use of right-hand threads) so that shoulders 70c and 170c engage, with balls 41c being held in their radially outer positions by centrifugal force, to thus screw stud 73c into a workpiece. After full installation, the section 23c is turned in a left-hand or unscrewing direction, so that balls 41c may move slightly radially inwardly to allow slight upward retraction of section 24c and its shoulder 70c relative to threads 29c, and thus break any binding engagement between shoulders 70c and 170c.

FIG. 11 shows another form of tool 10d for installing an internally and externally threaded insert of the type shown in FIG. 2. This tool 10d has a driving section 23d containing internal threads 45d into which an externally threaded portion 129d of shank 27d is screwed. A second part 77 also has internal threads 78 receiving threads 129d of shank 27d, so that the two parts 23d and 77 may be tightened relative to one another to have a lock-nut action urging their transverse planar surfaces at 79 tightly against one another in frictional locking relation. Part 77 has an externally non-circular, preferably hexagonal portion 80 engageable with a tool to tighten this part relative to section 23d (with the latter being engaged simultaneously by a second tool at its non-circular portion 26d).

Section 24d of the tool of FIG. 11 is rotatably received within the internally cylindrical portion 81 of part 77, and is retained against axial separation from part 77 by reception of a snap ring 82 partially within each of two opposed grooves 83 and 84 formed in parts 77 and 24d. Ring 82 is a sufficiently loose fit within groove 84 to enable axial movement of part 24d through the range allowed by the radial shifting movement of balls 41d, which are engageable with a directly transverse surface 43d on part 24d and a slightly angular surface 42d on part 77. The outwardly projecting threaded portion 29d of shank 27d is engageable with the internal threads in the insert to be driven.

The operation of the tool of FIG. 11 is the same as that discussed in connection with the first two forms of the invention, with section 24d being slightly axially retractable upon radially inward movement of balls 41d, to break the binding engagement of the end surface 70d with the insert. When it is desired to remove or replace shank 27d, this may be effected by merely unscrewing section 23d relative to part 27, to break the lock-nut action of parts 23d and 77, so that shank 27d may then be unscrewed from threads 78 for replacement.

It is to be understood that in any of the various forms of the invention, either one of the two surfaces corresponding to surfaces 42 and 43 of FIG. 1 may be the transverse surface, with the other surface then being disposed at an angle, or if desired both surfaces may be disposed at slight angles to a true transverse plane, so long as an appropriate relative angularity is maintained between the two surfaces.

I claim:
1. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, and means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart relative to one another as the surfaces advance in one radial direction.

2. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart relative to one another as the surfaces advance in one radial direction, and means yieldingly urging each rolling member in a radial direction the opposite of said radial direction in which the surfaces engaged thereby advance apart.

3. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, and means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart relative to one another as the surfaces advance radially outwardly, and means yieldingly urging said rolling members radially inwardly.

4. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, and means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart relative to one another as the surfaces advance radially inwardly.

5. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, and means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart at an angle less than 10 degrees relative to one another as the surfaces advance in one radial direction.

6. A tool for screwing a threaded element into a bore, comprising a first section adapted to be turned about a predetermined axis, means mounted to turn with said first section and having threads for engaging and holding said element, a second section adapted to turn with and relative to said first section about said axis, means forming a shoulder positioned to be pressed axially inwardly against said element by said second section, a plurality of rolling members at different locations about said axis for transmitting axially inward forces from said first section to the second section, and means forming, in engagement with each rolling member, a first surface through which axial load forces are transmitted from said first section to said member and an opposed second surface through which said forces are transmitted to said second section, each rolling member being free for movement radially of said axis between said two surfaces engaged thereby, said two surfaces being shaped to gradually advance axially apart at an angle between about 2 and 5 degrees relative to one another as the surfaces advance in one radial direction.

7. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, and a plurality of balls at different locations about said axis for transmitting axially inward forces from said first section to the second section as said element is screwed into said bore, said two sections having, in engagement with opposite sides of each ball, two axially opposed relatively rotatable surfaces, formed on the two sections respectively, and along which the ball rolls upon rotary movement of the first section relative to the second section in an unscrewing direction, each ball being free for movement radially of said axis between said two surfaces engaged thereby, said two surfaces being shaped to gradually advance axially apart relative to one another as the surfaces advance in one radial direction.

8. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, and a plurality of balls at different locations about said axis for transmitting axially inward forces from said first section to the second section as said element is screwed into said bore, said two sections having, in engagement with opposite sides of each ball, two axially opposed relatively rotatable surfaces, formed on the two sections respectively, and along which the ball rolls upon rotary movement of the first section relative to the second section in an unscrewing direction, each ball being free for movement radially of said axis between said two surfaces engaged thereby, said two surfaces being shaped to gradually advance axially apart relative to one another as the surfaces advance radially outwardly, and means yieldingly urging said rolling members radially inwardly.

9. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, and a plurality of balls at different locations about said axis for transmitting axially inward forces from said first section to the second section as said element is screwed into said bore, said two sections having, in engagement with opposite sides of each ball, two axially opposed relatively rotatable surfaces, formed on the two sections respectively, and along which the ball rolls upon rotary movement of the first section relative to the second section in an unscrewing direction, each ball being free for movement radially of said axis between said two surfaces enengaged thereby, said two surfaces being shaped to gradually advance axially apart relative to one another as the surfaces advance radially inwardly.

10. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, and a plurality of balls at different locations about said axis for transmitting axially inward forces from said first section to the second section as said element is screwed into said bore, said two sections having, in engagement with opposite sides of each ball, two axially opposed surfaces, formed on the two sections respectively, and along which the ball rolls upon rotary movement of the first section relative to the second section in an unscrewing direction, each ball being free for movement radially of said axis between said two surfaces engaged thereby, said two surfaces being shaped to gradually advance axially apart relative to one another as the surfaces advance radially outwardly, and a resilient member disposed about said balls and yieldingly urging said balls radially inwardly.

11. A tool for screwing a threaded element into a bore, comprising a first section adapted to be turned about a predetermined axis, means on said first section engageable by a rotary driving unit in driving relation, a second section adapted to turn with and relative to said first section about said axis, a shank projecting from said first section along said axis through an opening in said second section and having an externally threaded portion projecting beyond the second section for engaging and driving said threaded element, said second section having a shoulder disposed about said shank positioned to be pressed axially inwardly against said element, said sections having two generally annular axially opposed surfaces, a plurality of balls between and engaging said surfaces and transmitting forces therebetween, said balls being free for movement circularly about said axis and radially thereof, said two surfaces being shaped to gradually advance axially apart as they advance radially outwardly, a resilient member disposed about said balls and between said surfaces and yieldingly urging the balls radially inwardly, and a part disposed about both of said sections and about said resilient member and retaining said sections against axial separation while permitting relative rotation thereof.

12. A tool for screwing a threaded element into a bore, comprising a first section adapted to be turned about a predetermined axis, means on said first section engageable by a rotary driving unit in driving relation, a second section adapted to turn with and relative to said first section about said axis, a shank projecting from said first section along said axis through an opening in said second section and having an externally threaded portion projecting beyond the second section for engaging and driving said threaded element, said second section having a shoulder disposed about said shank positioned to be pressed axially inwardly against said element, said first section having an essentially annular surface disposed transversely of said axis, said second section having an essentially annular surface axially opposite and facing said first mentioned surface and gradually advancing axially away from said first surface at an angle between about 2 degrees and 5 degrees as the surfaces advance radially outwardly, a plurality of balls between and engaging said surfaces and transmitting forces therebetween, said balls being free for movement circularly about said axis and radially thereof, a resilient member disposed about said balls and between said surfaces and yieldingly urging the balls radially inwardly, and a part disposed about both of said sections and about said resilient member and retaining said sections against axial separation while permitting relative rotation thereof.

13. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, and a plurality of balls at different locations about said axis for transmitting axially inward forces from said first section to the second section as said element is screwed into said bore, said two sections having, in engagement with opposite sides of each ball, two axially opposed relatively rotatable surfaces, formed on the two sections respectively, and along which the ball rolls upon rotary movement of the first section relative to the second section in an unscrewing direction, each ball being free for movement radially of said axis between said two surfaces engaged thereby, said two surfaces being shaped to gradually advance axially apart relative to one another as the surfaces advance radially inwardly, said two surfaces advancing apart at a very slight angle between about 2 and 5 degrees so that said balls may be held outwardly by centrifugal force against the camming tendency of said surfaces when the tool is turned.

14. A tool for screwing a threaded element into a bore, comprising a first section adapted to be turned about a predetermined axis, means on said first section engageable by a rotary driving unit in driving relation, a second section adapted to turn with and relative to said first section about said axis, a shank projecting from said first section along said axis through an opening in said second section and having an externally threaded portion projecting beyond the second section for engaging and driving said threaded element, said second section having a shoulder disposed about said shank positioned to be pressed axially inwardly against said element, said first section having an essentially annular surface disposed approximately transversely of said axis, said second section having an essentially annular approximately transverse surface axially opposite and facing said first mentioned surface, said surfaces gradually advancing axially away from one another as they advance radially inwardly and at an angle between about 2 degrees and 5 degrees, a plurality of balls between and engaging said surfaces and transmitting forces therebetween, said balls being free for movement circularly about said axis relative to said surfaces and for movement radially of said axis, a housing part disposed about both of said sections and retaining said sections against axial separation while permitting relative rotation thereof.

15. A tool as recited in claim 14, in which said first section includes a main part carrying said shank and a separable part having said first ball engaging surface formed thereon, a snap ring retaining said separable part and said balls and first section in the housing, and additional spring pressed detent means retaining said main part of the first section and said shank in the housing.

16. A tool for screwing a threaded element into a bore, comprising a first section adapted to be turned about a predetermined axis, work-holding means mounted to turn with said first section and having threads for engaging and holding said element, a second section adapted to turn with and relative to said first section about said axis, means forming a shoulder positioned to be pressed axially inwardly against said element by said second section, a plurality of balls at different locations about said axis for transmitting axially inward forces from said first section to the second section as said element is screwed into said bore, said two sections having, in engagement with opposite sides of each ball, two axially opposed surfaces, formed on the two sections respectively, and along which the ball rolls upon rotary movement of the first section relative to the second section in an unscrewing direction, each ball being free for movement radially of said axis between said two surfaces engaged thereby, said two surfaces being shaped to gradually advance axially apart relative to one another as the surfaces advance in one radial direction, and means retaining said sections against axial separation while permitting their relative rotation 17. A tool as recited in claim 1, in which said threads for engaging and holding said element are internal threads for engaging external threads on an outwardly projecting portion of said element.

References Cited by the Examiner

UNITED STATES PATENTS

| | | | |
|---|---|---|---|
| 1,767,107 | 6/1930 | Yates | 308—201 |
| 2,493,232 | 1/1950 | Dodge | 192—56 |
| 2,795,159 | 6/1957 | Sipe. | |
| 2,949,800 | 7/1960 | Neuschotz. | |

WILLIAM FELDMAN, *Primary Examiner.*

G. WEIDENFELD, *Assistant Examiner.*